United States Patent [19]
Phillips

[11] Patent Number: 5,782,480
[45] Date of Patent: Jul. 21, 1998

[54] WHEELED AMPHIBIOUS VEHICLE

[76] Inventor: Reuben Phillips, 3203 Saddle Rock Rd., Holbrook, N.Y. 11741

[21] Appl. No.: 575,280

[22] Filed: Dec. 20, 1995

[51] Int. Cl.$^6$ ................................................ B62K 5/04
[52] U.S. Cl. .................. 280/282; 280/270; 280/288.3; 114/270; 440/30
[58] Field of Search .............................. 280/200, 210, 280/213, 220, 259–261, 263, 270, 274, 282, 288.1, 288.3; 114/114 R, 270; 440/26, 27, 30; 297/377

[56] References Cited

U.S. PATENT DOCUMENTS

| | | |
|---|---|---|
| 92,807 | 7/1869 | Farmer . |
| 1,667,940 | 5/1928 | Life ............................ 280/282 |
| 2,777,138 | 1/1957 | Gallagher .................... 297/377 |
| 3,091,209 | 5/1963 | Leiberman ................... 440/30 |
| 3,375,801 | 4/1968 | Fee .............................. 114/270 |
| 3,606,856 | 9/1971 | Moraga . |
| 3,895,596 | 7/1975 | Amour . |
| 4,072,124 | 2/1978 | Meyrin . |
| 4,077,351 | 3/1978 | Girona ........................ 280/287 |
| 4,359,231 | 11/1982 | Mulcahy .................. 280/288.1 X |
| 4,432,561 | 2/1984 | Feikema et al. ............. 280/263 |
| 4,533,330 | 8/1985 | Chun ............................ 440/30 |
| 4,926,777 | 5/1990 | Davis, Jr. ..................... 114/270 |
| 5,149,118 | 9/1992 | Oxford ....................... 280/250.1 |
| 5,178,088 | 1/1993 | Howard ....................... 114/270 |
| 5,263,732 | 11/1993 | Harmeyer ................... 280/288.1 |
| 5,291,846 | 3/1994 | Davis, Jr. ..................... 114/270 |

*Primary Examiner*—Anne Marie Boehler
*Attorney, Agent, or Firm*—Shoemaker and Mattare, Ltd.

[57] ABSTRACT

A human-powered wheeled amphibious vehicle includes a substantially planar buoyant base member upon which the rider sits while pedaling to turn the rear wheels of the vehicle. The rear wheels have inner-tube-like pneumatic tires and blades and/or paddle structure for improved traction in water. A single front wheel is supported on the base member by a turntable which is oscillated by moving a pair of handles, each mounted in a slot in the base member and reciprocable fore and aft.

12 Claims, 5 Drawing Sheets

5,782,480

1

WHEELED AMPHIBIOUS VEHICLE

BACKGROUND OF THE INVENTION

This invention relates to transportation, generally, and more particularly to a human-powered three-wheeled amphibious vehicle.

Prior inventors have proposed a number of tricycles, or the like, which are pedaled and can ride either on dry ground or in water.

An amphibious vehicle should be easy to pedal and steer, should roll smoothly on land, and should be efficient in water. It should have good buoyancy, even when capsized, and should have a collapsed form for storage and transportation.

SUMMARY OF THE INVENTION

An object of the invention is to improve upon the prior devices of this type by providing improved seating, steering, and traction in water, while not compromising land riding qualities.

This and other objects are attained by a human-powered wheeled amphibious vehicle comprising a substantially planar buoyant base member, a single front wheel mounted on the base member, portions of the wheel extending above and below the base member.

The vehicle has a mechanism for pivoting the wheel about an axis substantially perpendicular to the base member, including a pair of handles, each mounted in a slot in the base member and reciprocable fore and aft by an operator of the vehicle.

Each of the rear wheels of the vehicle has a soft tubular tire for quiet running and a paddle attachment for generating propulsion when the vehicle is in water. The wheels are rotated by driving means comprising a pedal mechanism and means connecting the pedal mechanism to the rear wheels.

BRIEF DESCRIPTION OF THE DRAWINGS

In the accompanying drawings.

DESCRIPTION OF THE PREFERRED EMBODIMENT

Figure 1:
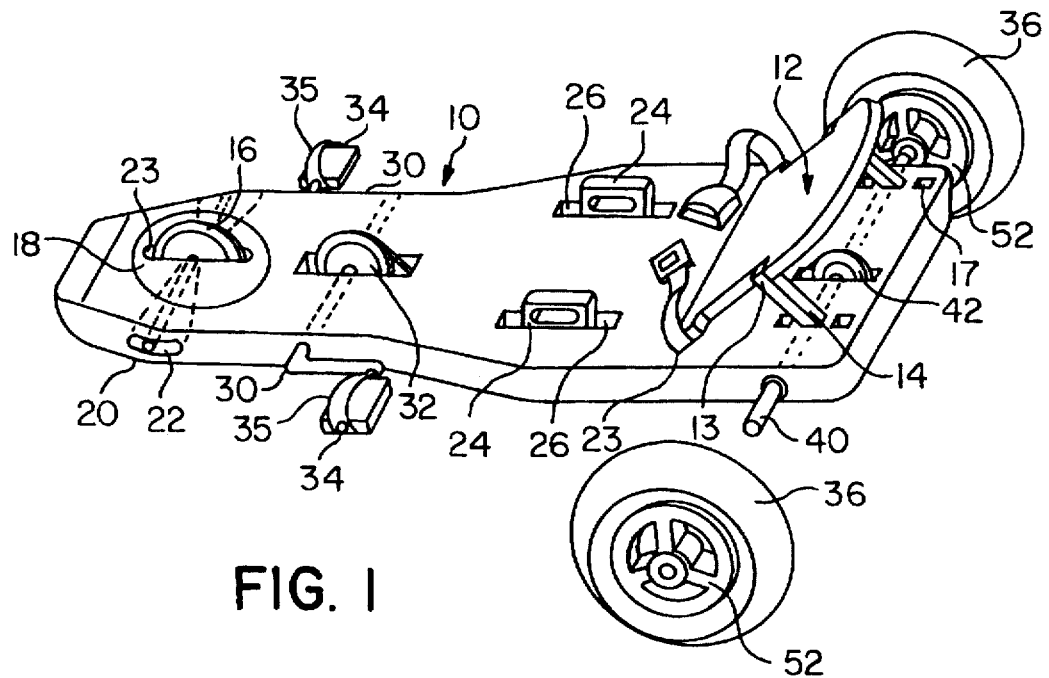
FIG. 1 is a perspective view, from above the left rear, of a wheeled amphibious vehicle embodying the invention.

A wheeled amphibious vehicle embodying the invention includes a substantially planar, buoyant base member 10 of sufficient volume to support the weight of a rider in water. The base member is preferably a single piece of molded closed-cell foam such as a polystyrene foam.

The rider sits near the center of the base member in front of an adjustable back 12 supported at the bottom by pivot pins 11 and near the top supported by props 14, which are connected to the back by hinge pins 13. The front upper surface of the back is contoured to conform to the human form. The back can fold down flat into a recess in the base. Each prop 14 has a ball 15 at its lower end, which snaps into one of a series of sockets 17 in the base, so that the seat back angle can be adjusted. The props can be stowed in cutouts 21 at the sides of the back, when they are not deployed.

A cushion is preferably attached to the seat back, and a seat belt 23 may be installed as well. Both items are shown in FIG. 1.

A front wheel 16, which is narrow, so that it may also act as a rudder, but sufficiently wide not to sink into sand, is supported in a slot 23 in a turn table 18 which can pivot about a vertical axis. The wheel is mounted on a front axle 20, one end of which can be seen in FIG. 1. The axle's ends can slide fore and aft in a slot 22 as the axle pivots with the turntable about a vertical axis. The width of the slot determines the maximum steering deviation.

Figure 4:
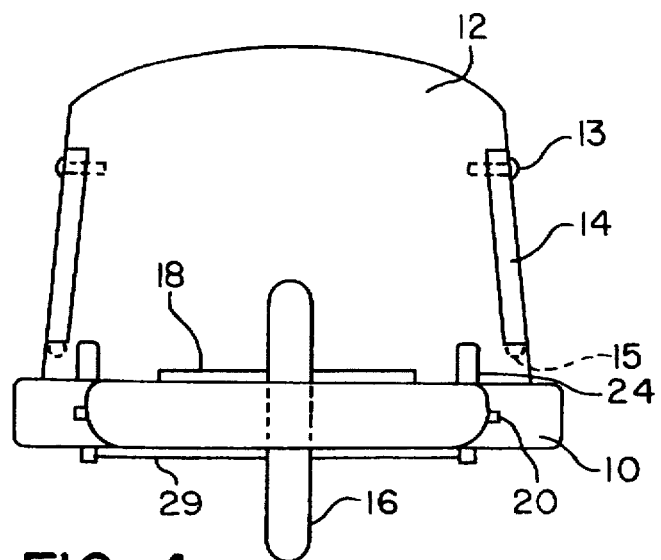
FIG. 4 is a front elevation thereof, less the rear wheels.
Figure 5:
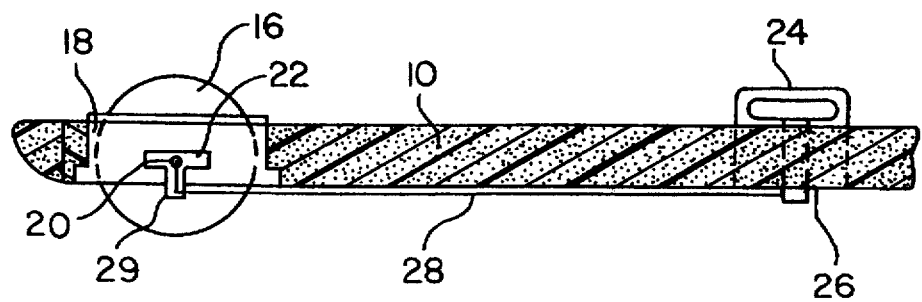
FIG. 5 is a fragmentary sectional view taken on the line 5—5 in FIG. 2.

Steering handles 24 are provided on either side of the base, in front of the seat back, in a natural position for grasping. They may have holes or indentations as shown, to improve the operator's grip. Each steering handle is constrained to fore and aft reciprocation within a respective slot 26 formed in the base. Two steering rods 28 interconnect the handles to slotted ends of a bar 29 (FIG. 4) affixed to the bottom of the turn table 18, so that the turn table is oscillated by pushing on one handle while pulling on the other.

The base 10 has, just rearward of the turn table 18, a rectangular opening through which a crankshaft 30 passes. A sprocket 32 is secured at the center of the crankshaft, and a pedal 34 is installed at the end of each crank arm, as on a conventional bicycle. The pedals preferably are provided with toe straps 35 to help keep one's feet on the pedals.

Figure 2:
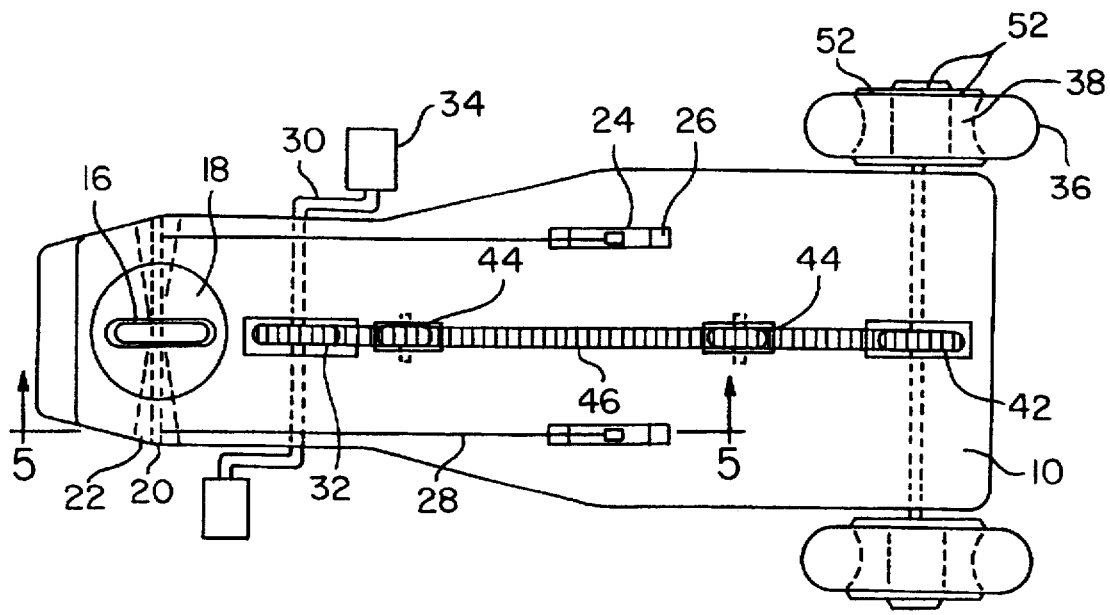
FIG. 2 is a bottom view thereof.
Figure 3:
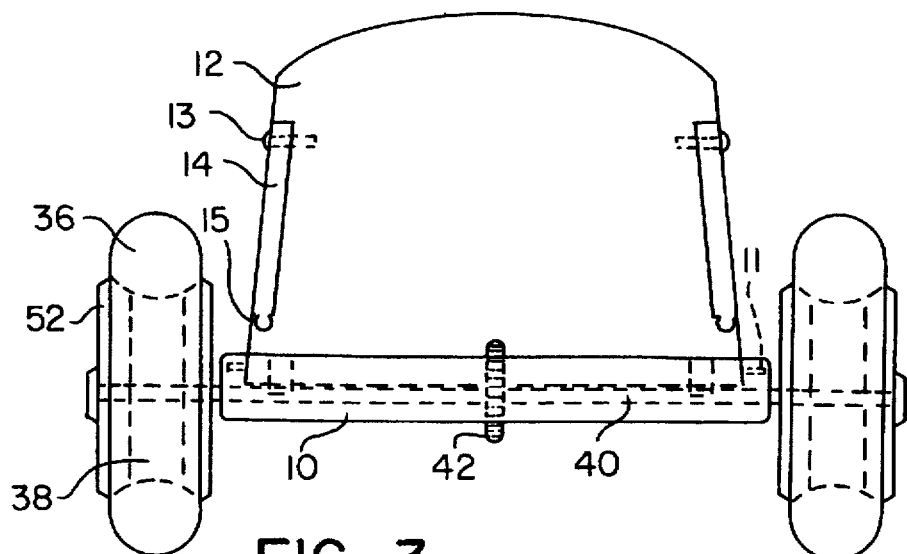
FIG. 3 is a rear elevation thereof.
Figure 12:
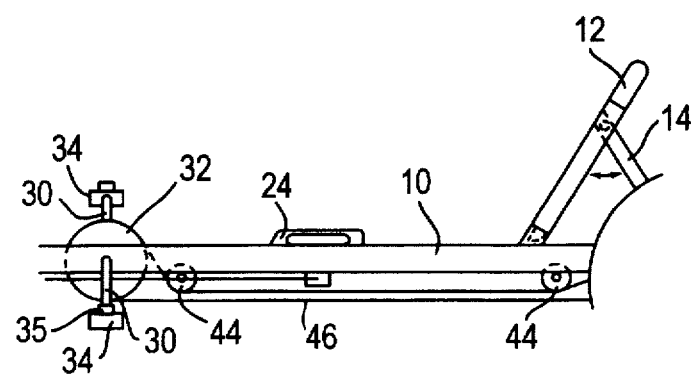
FIG. 12 is a side elevation of a portion of the vehicle, showing its chain drive.

At the rear of the base, two soft tubular tires 36 are mounted on respective rims 38 interconnected by a rear axle 40. Each tire may be made of inner-tube material such as butyl rubber, and is inflated at low pressure. A rear sprocket 42, situated in a second rectangular slot in the base, is secured at the center of the rear axle. The sprockets 32, 42 are interconnected by a chain 46, which is shown in FIGS. 2 and 12. A groove may be formed on the bottom surface of the base, to guide the chain and give it sufficient ground clearance. Note the idlers 44, mounted on the bottom of the base, which keep the chain out of contact with and below the base member.

Figure 6:
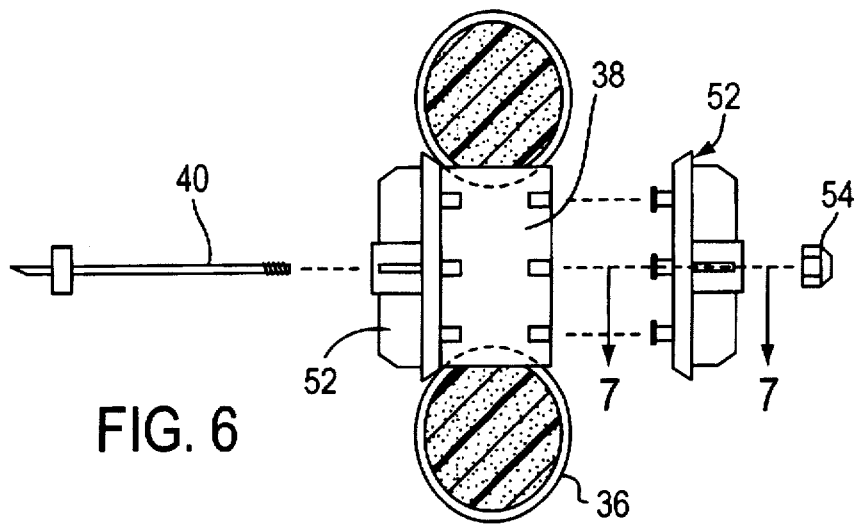
FIG. 6 is an exploded sectional view, on a vertical plane, of a rear tire and wheel.
Figure 7:
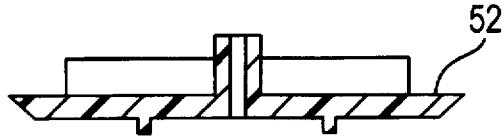
FIG. 7 is a sectional view of a hub cap, taken on the line 7—7 in FIG. 6.
Figure 8:
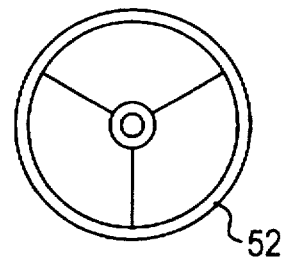
FIG. 8 is side elevation thereof.
Figure 9:
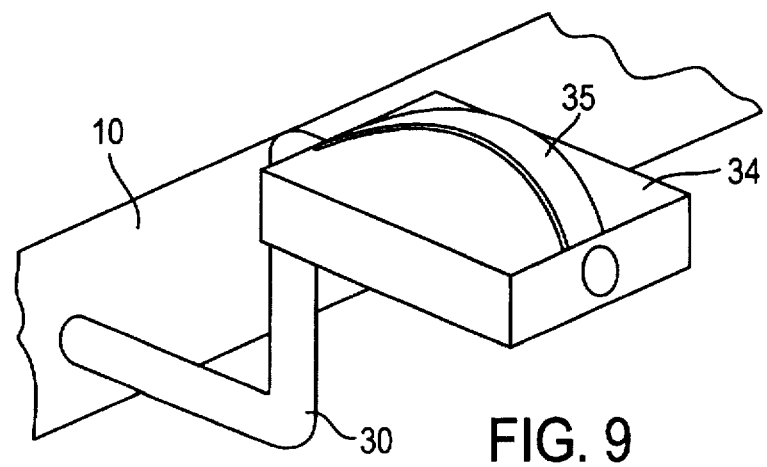
FIG. 9 is a perspective view of one crank arm and pedal.
Figure 10:
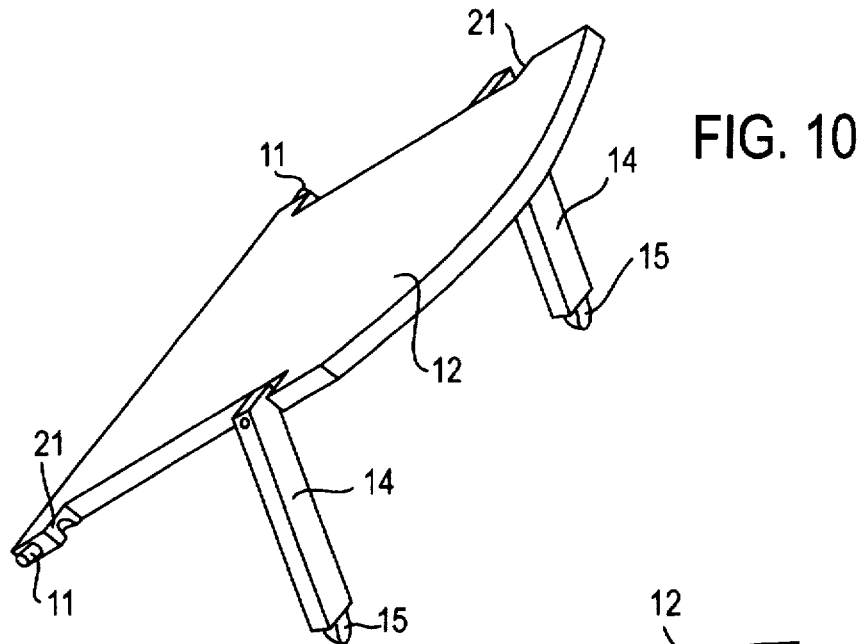
FIG. 10 is a perspective view of the seat back.
Figure 13:
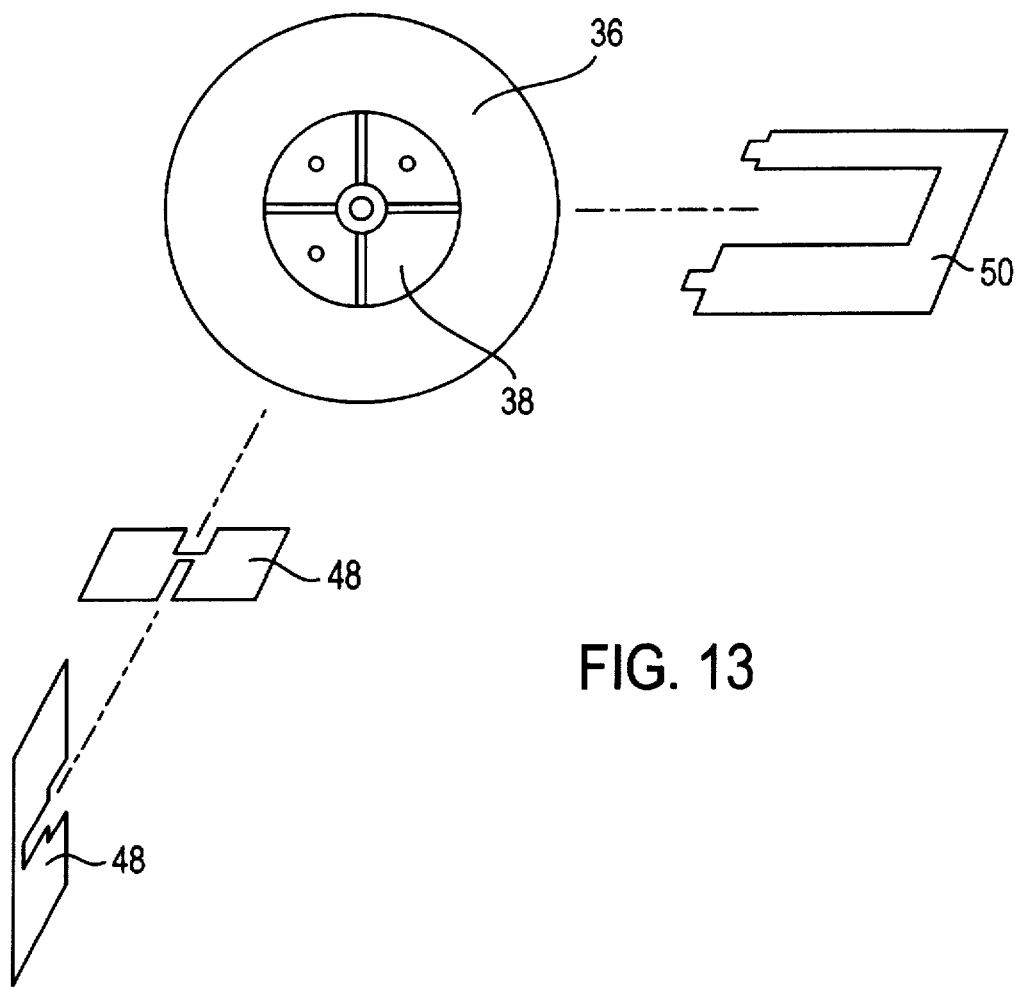
FIG. 13 is an exploded view showing the tire and fins which may be added for additional marine traction.

To provide traction in water, the rear wheel and/or tire are outfitted with paddles or the like. The paddles 52, 53 (FIG. 1) may be formed as an integral part of each rim 38; however, I prefer to use instead inner and outer hub caps— see FIGS. 6–8—having the paddles molded on them. Alternatively, or in addition, removable blades 48, 50 (FIG. 13) may be provided, which can be retrofitted onto the outer end of the wheel, and on the tire itself.

Figure 11:
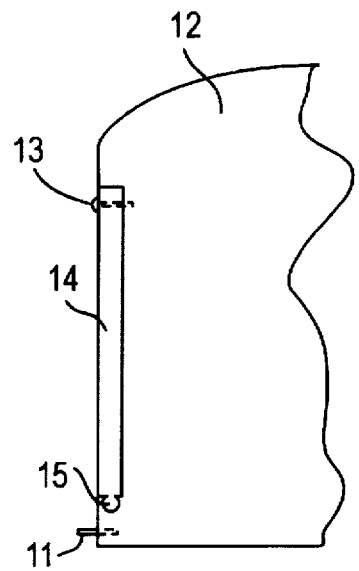
FIG. 11 is a rear view of the seat back, taken along a line of sight perpendicular to the rear of the back.

Each hub cap is affixed to the wheel rim 38, as shown in FIG. 11, by means of three lugs that press or screw into corresponding holes in the wheel rim when the hub cap is installed. Preferably, the axle 40 extends through both the rim and the hub cap, and has a threaded outer end onto which a lock nut 54 is installed, to retain the outer hub cap.

One may exercise some discretion in selecting materials for the various components of this invention. However, because the vehicle is expected to be ridden in water, all metal parts, such as the steering rods, axles, sprockets and cranks, ought to be made of a non-rusting alloy such as stainless steel, or plated or otherwise coated to prevent corrosion. The chain may be made of stainless steel, or a plastic chain (i.e. PTFE) may be employed. The major structural parts may be formed of a polymeric material such as polystyrene. Although antifriction bearings are not required in the device as it is presently contemplated for casual use, they may be added.

Since the invention is subject to modifications and variations, it is intended that the foregoing description and the accompanying drawings shall be interpreted as only illustrative of the invention defined by the following claims.

I claim:

1. A human-powered wheeled amphibious vehicle comprising a substantially planar buoyant base member, a single front wheel mounted on the base member so that a portion of the front wheel extends above the base member, and a portion of the front wheel extends below the base member, and the wheel rotates about an axis parallel to the base member, means for pivoting the wheel about an axis substantially perpendicular to the base member, said pivoting means comprising a pair of handles, each mounted in a slot in the base member and reciprocable fore and aft by an operator of the vehicle, a pair of rear wheels mounted on the base member rearward of the handles, each of said rear wheels comprising a tubular tire and paddle means for generating propulsion when the vehicle is in water, and human-powered driving means for rotating the rear wheels, said driving means comprising a pedal mechanism and means connecting the pedal mechanism to the rear wheels.

2. The invention of claim 1, wherein the front wheel is mounted on an axle, and the base member has a pair of slots, one on either side of the front wheel, for receiving the ends of the axle and permitting the axle ends to slide within the slots to permit limited pivoting of the front wheel.

3. The invention of claim 1, wherein the front wheel is mounted on a turn table installed in an opening in the base member, and further comprising rods linking the handles with the turn table.

4. The invention of claim 1, further comprising an adjustable back for supporting the operator in a reclined position.

5. The invention of claim 4, wherein the back is connected at a bottom of the base member by a pair of hinge pins, and further comprising a pair of props for supporting the back in a raised position.

6. The invention of claim 5, wherein the base member has two series of sockets, the sockets in each series being at various distances from a respective one of said hinge pins, and each of said props has a distal protuberance for seating in a selected one of said sockets, so that the back height can be altered.

7. The invention of claim 5, wherein said back has a pair of cutouts, each for receiving a respective one of said props when said props are not deployed.

8. The invention of claim 5, wherein said base member has a recess shaped to receive said back when said back is fully lowered.

9. The invention of claim 1, wherein said pedal mechanism comprises a crank having a center shaft with a pair of arms at either end, a pedal mounted at an end of each arm, a sprocket mounted upon the center shaft, and a chain connecting said sprocket to said rear wheels.

10. The invention of claim 9, wherein said rear wheels are mounted on a common rear axle, and further comprising a rear sprocket mounted on said rear axle, said chain extending around both said sprockets.

11. The invention of claim 10, wherein the chain is guided, between the sprockets, along a path below the base member by at least one idler sprocket.

12. The invention of claim 1, further comprising a pair of hubcaps, one mounted on each of said rear wheels, each having a blade structure for engaging water when the vehicle is afloat.

* * * * *